United States Patent [19]
Prea

[11] Patent Number: 6,164,666
[45] Date of Patent: Dec. 26, 2000

[54] ADAPTABLE CYCLE

[75] Inventor: Francois Prea, Saint Avertin, France

[73] Assignee: X-Hold, Cormery, France

[21] Appl. No.: 08/982,539

[22] Filed: Dec. 2, 1997

[30] Foreign Application Priority Data

Dec. 2, 1996 [FR] France .................................. 96 14762

[51] Int. Cl.[7] .................................................. A63C 17/18
[52] U.S. Cl. ........................ 280/7.15; 280/278; 280/287
[58] Field of Search ................................... 280/200, 7.15, 280/7.1, 7.14, 278, 287, 282

[56] References Cited

U.S. PATENT DOCUMENTS

| | | | |
|---|---|---|---|
| 1,854,337 | 4/1932 | Kraeft | 280/7.1 |
| 2,451,665 | 10/1948 | Di Bartolomeo | 280/7.15 |
| 2,458,127 | 1/1949 | Ahrens | 280/7.15 |
| 3,532,351 | 10/1970 | Kaufman . | |
| 3,658,354 | 4/1972 | Read | 280/7.15 |
| 5,899,481 | 5/1999 | Ferrarin | 280/287 |

FOREIGN PATENT DOCUMENTS

| | | |
|---|---|---|
| 187170 | 7/1986 | European Pat. Off. . |
| 668209 | 8/1995 | European Pat. Off. . |
| 2611641 | 9/1988 | France . |
| 28381 | 8/1884 | Germany . |
| 3831629 | 3/1990 | Germany . |

*Primary Examiner*—Matthew C. Graham
*Assistant Examiner*—Pamela J. Lipka
*Attorney, Agent, or Firm*—Merchant & Gould P.C.

[57] ABSTRACT

A child's cycle is provided which is adaptable, as the child grows, between a tricycle configuration and a bicycle configuration, the cycle comprising a frame 4, 13, 14 with, in the bicycle configuration, a bicycle axle mounted on the frame and able to carry a rear wheel 8; and in the tricycle configuration, additionally a tricycle axle able to carry a second rear wheel, adapted to be coupled to the bicycle axle to form an axle 9 carrying two wheels, the axle being mounted on the frame. For this, one end of the bicycle axle is adapted for coupling it either to the frame or to the tricycle axle.

20 Claims, 11 Drawing Sheets

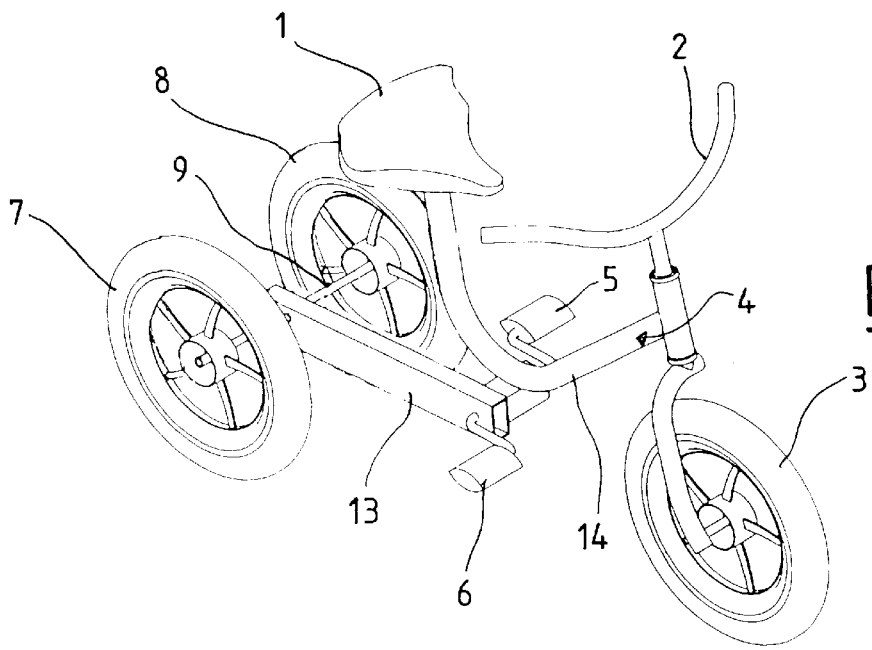
FIG_1
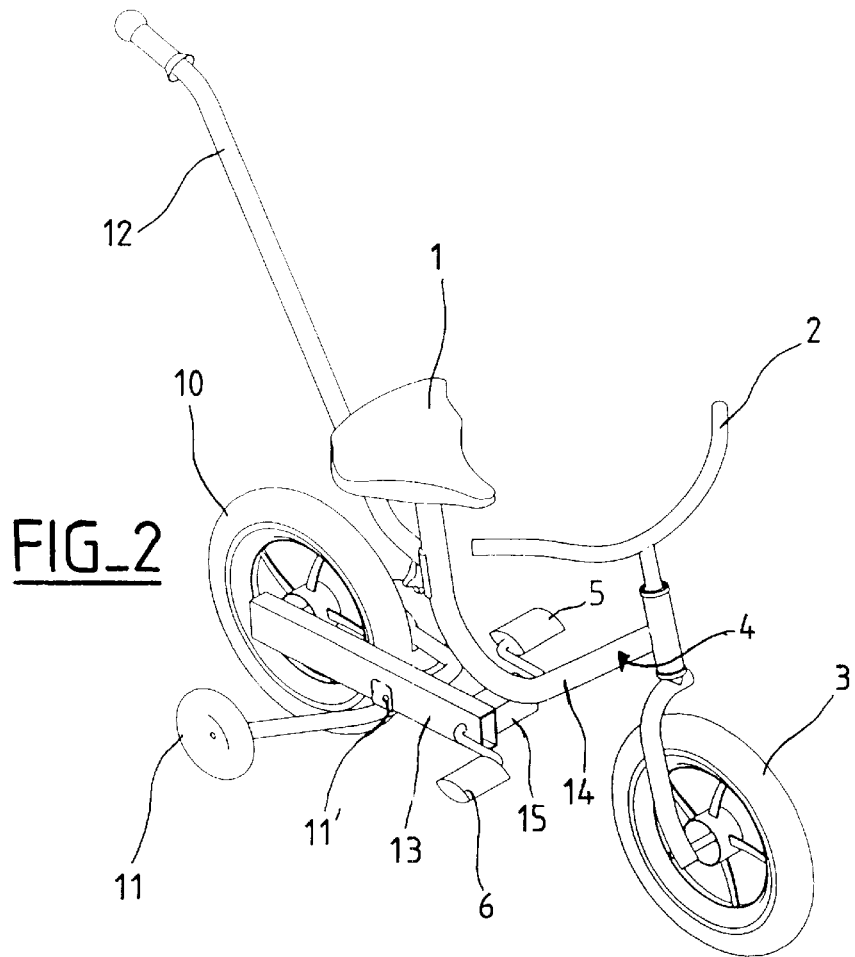
FIG_2

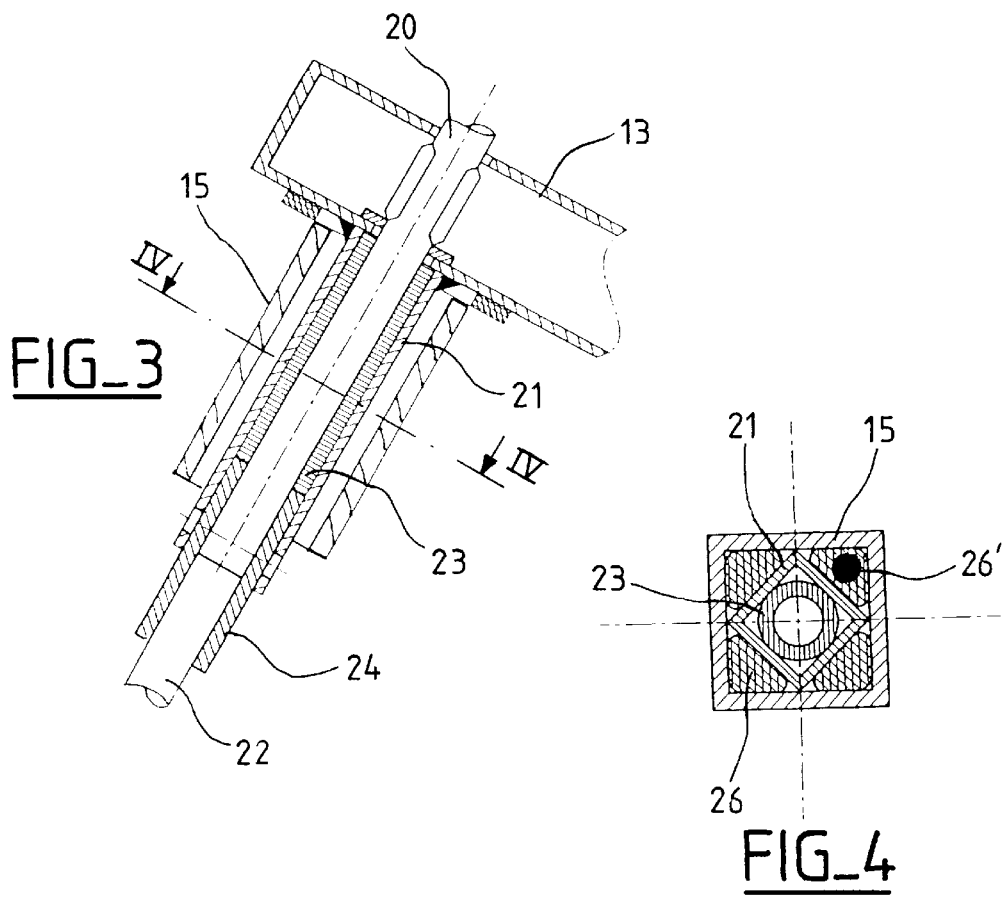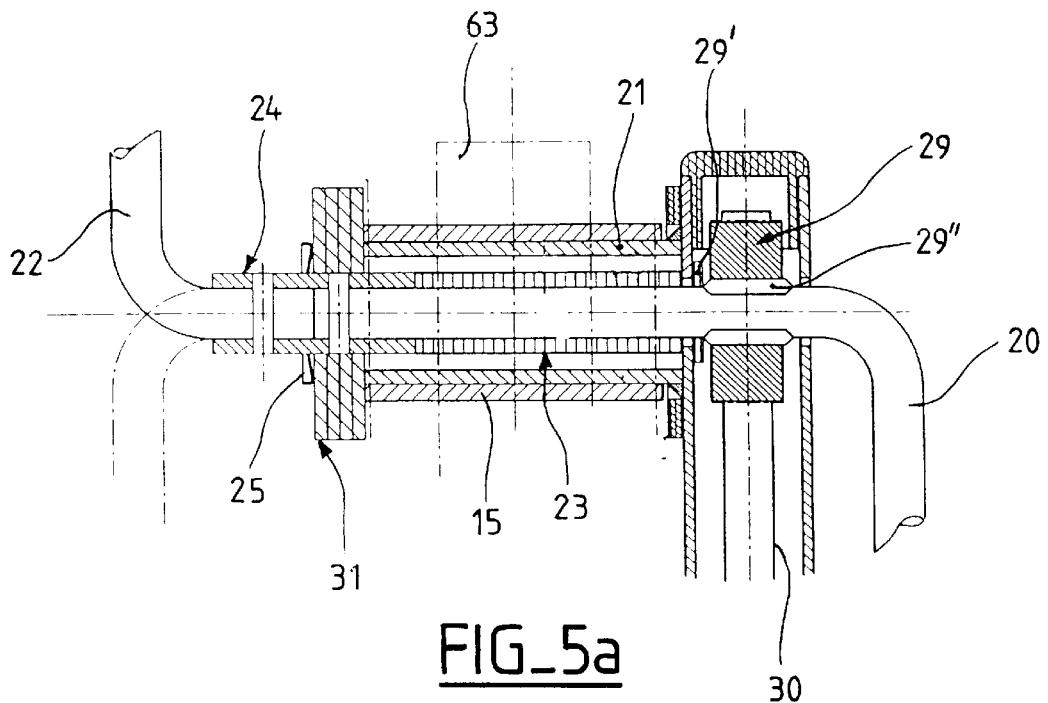

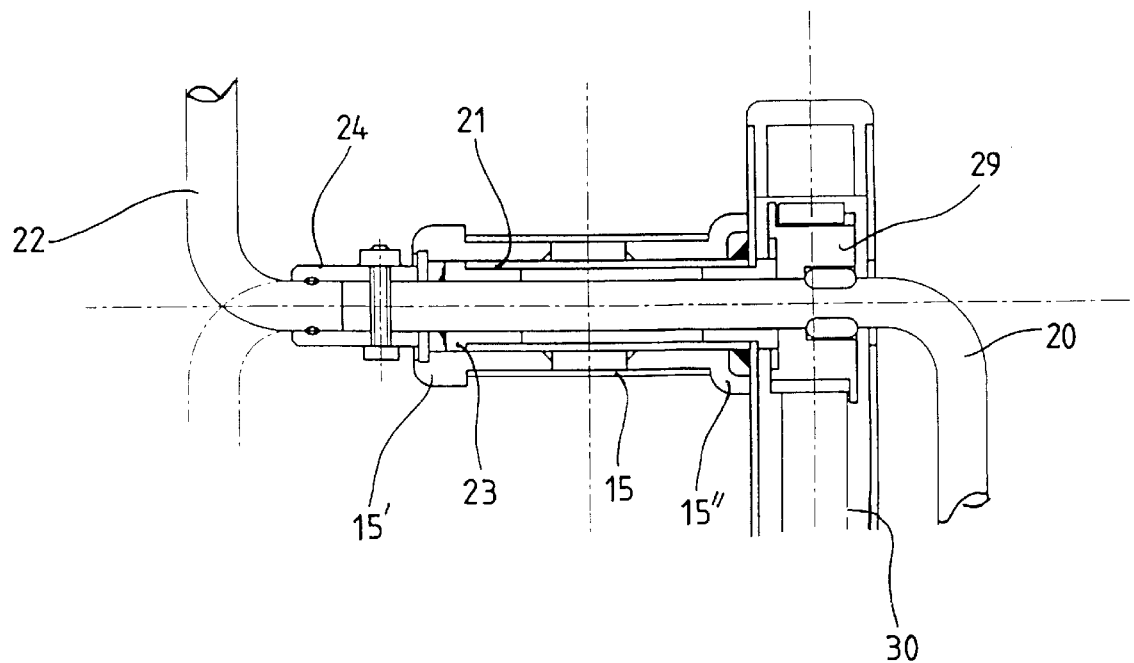

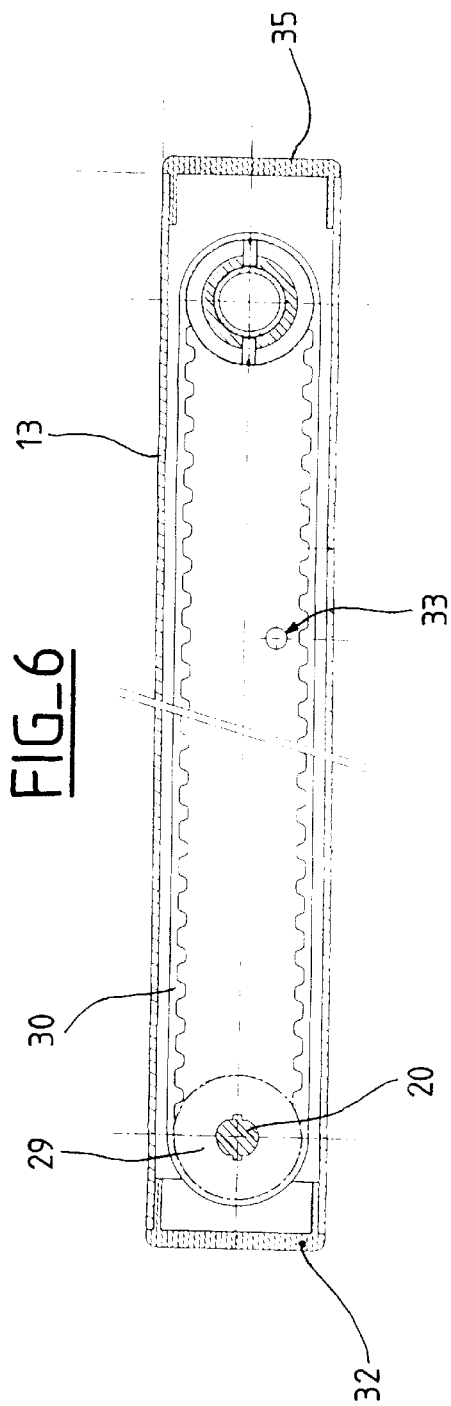
FIG_6
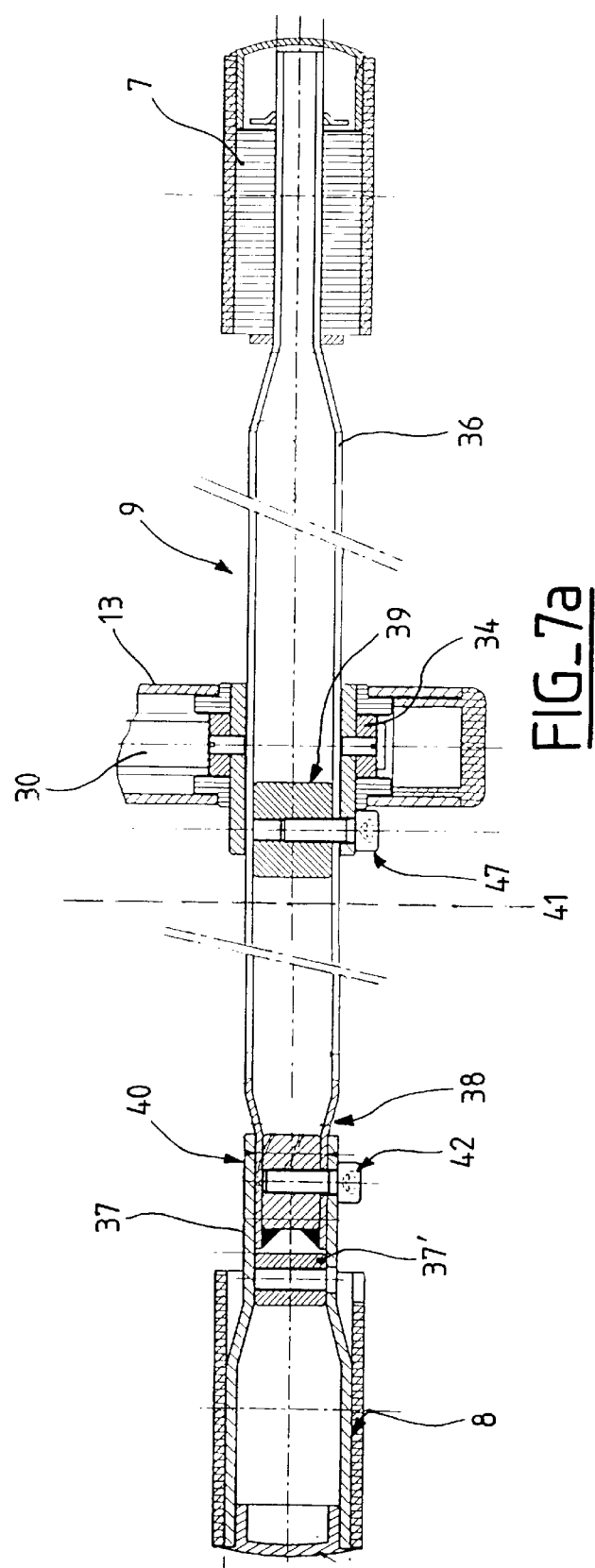
FIG_7a

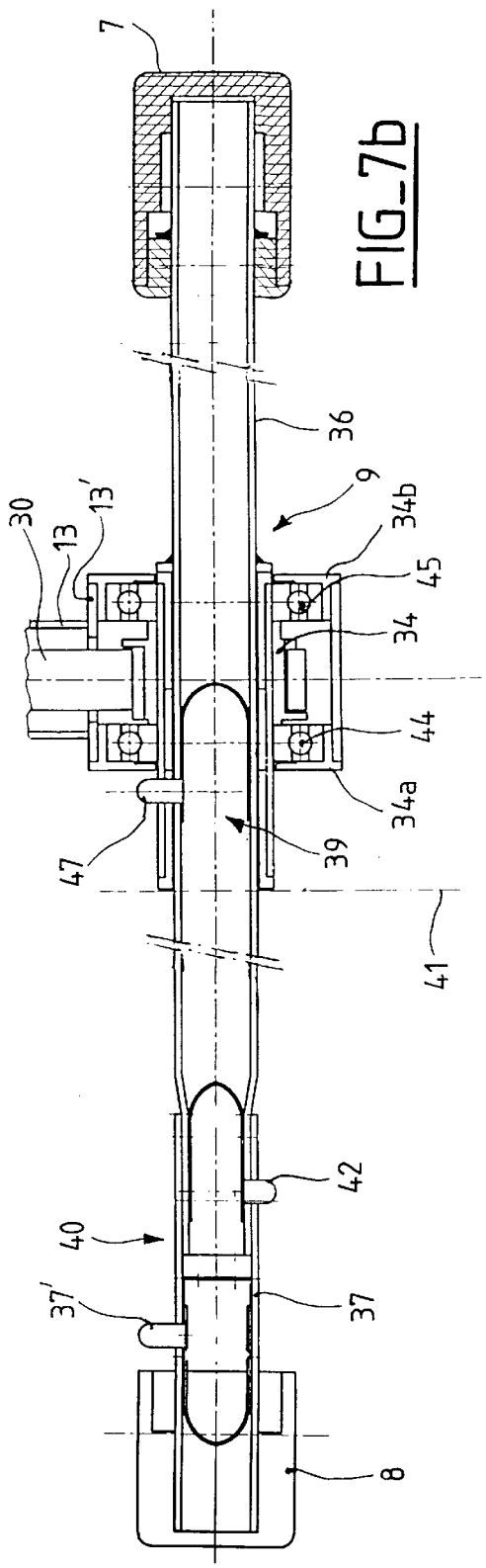
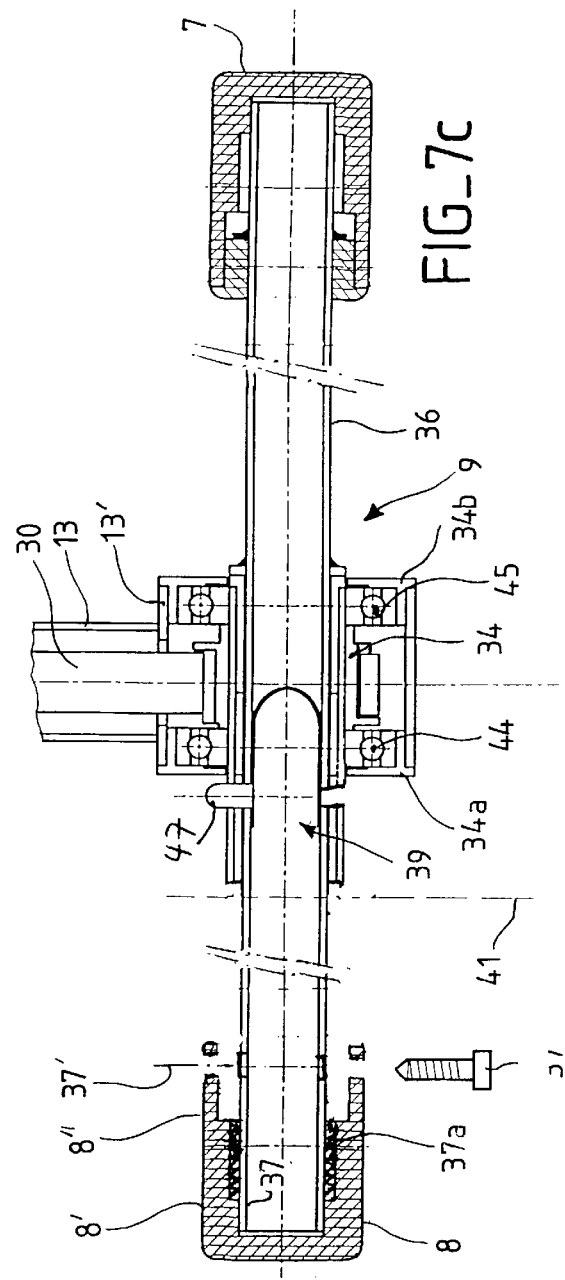
FIG_7b
FIG_7c

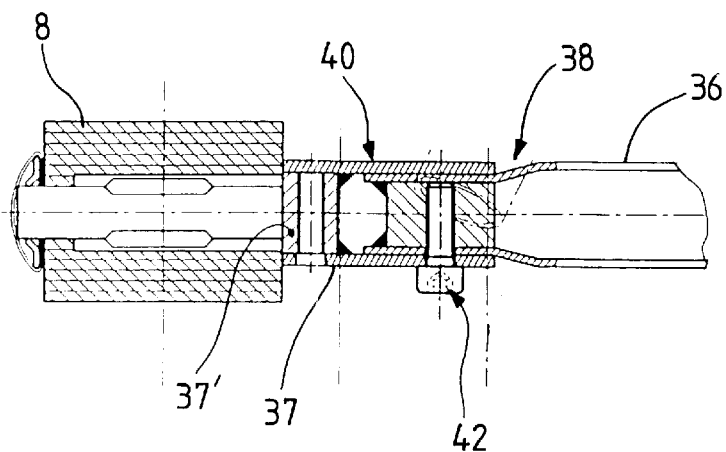
FIG_8
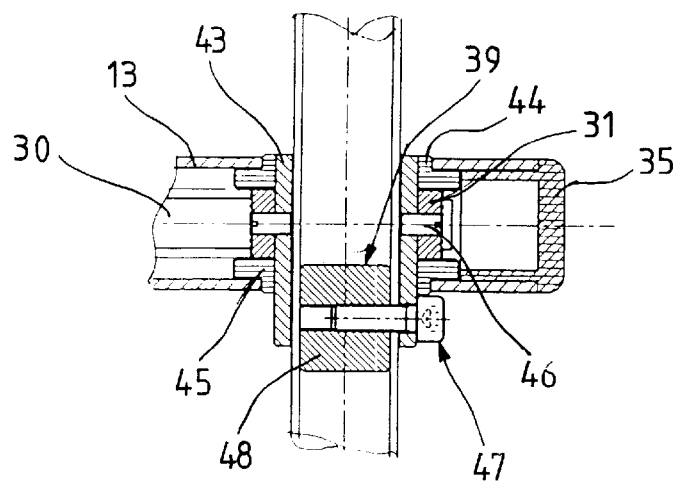
FIG_9
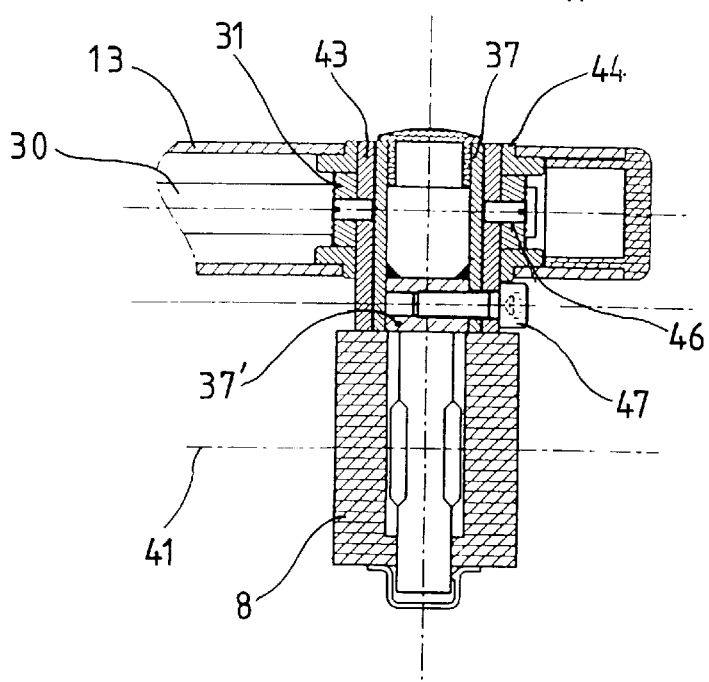
FIG_10

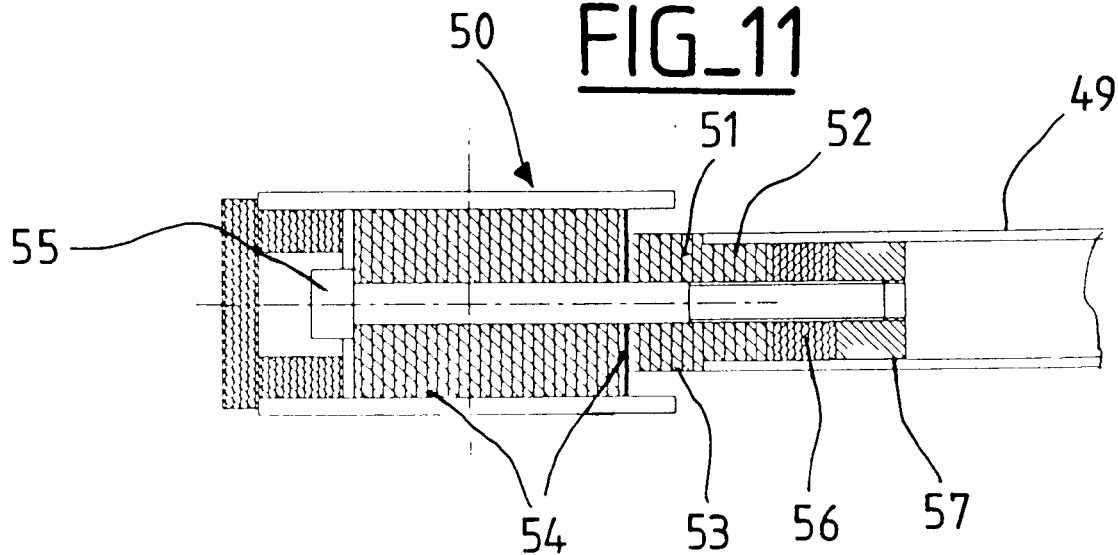
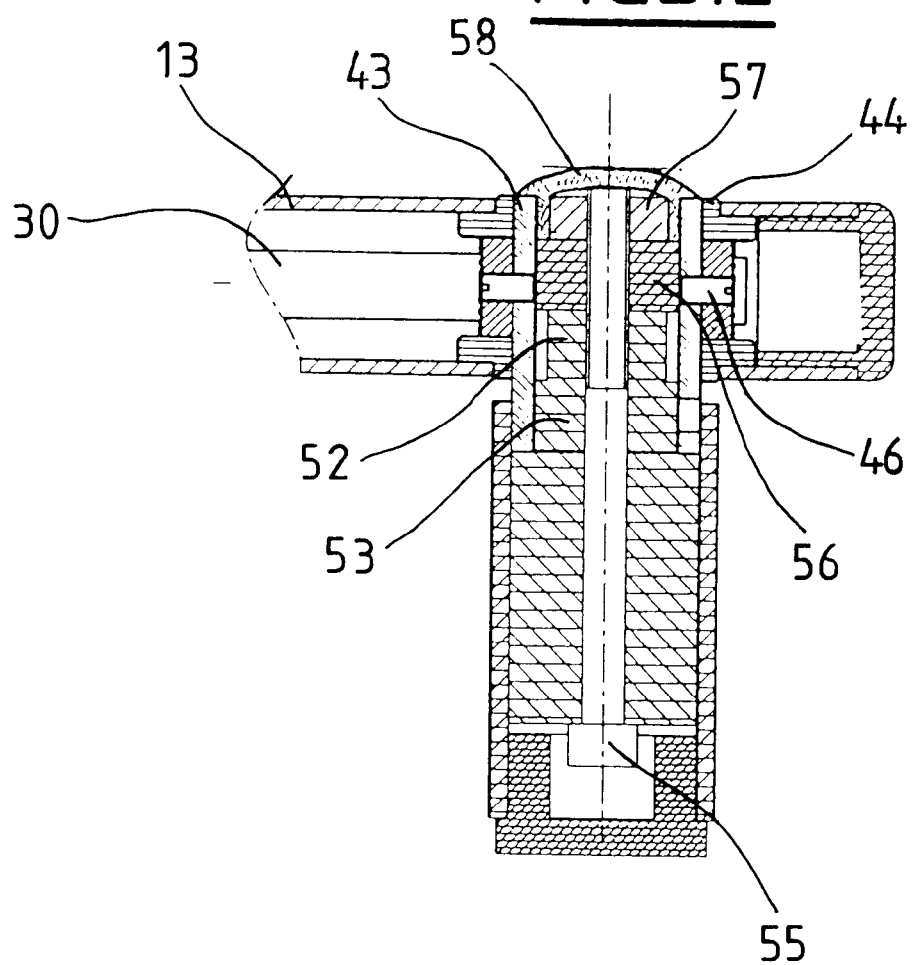

FIG_13
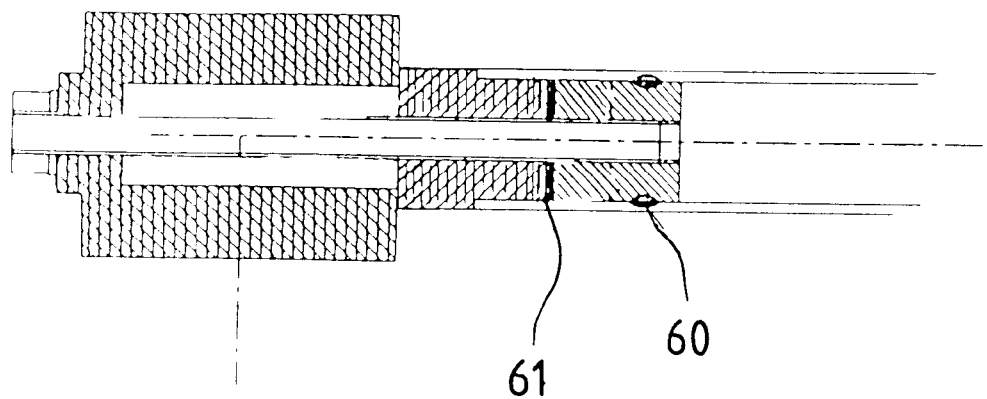
FIG_14
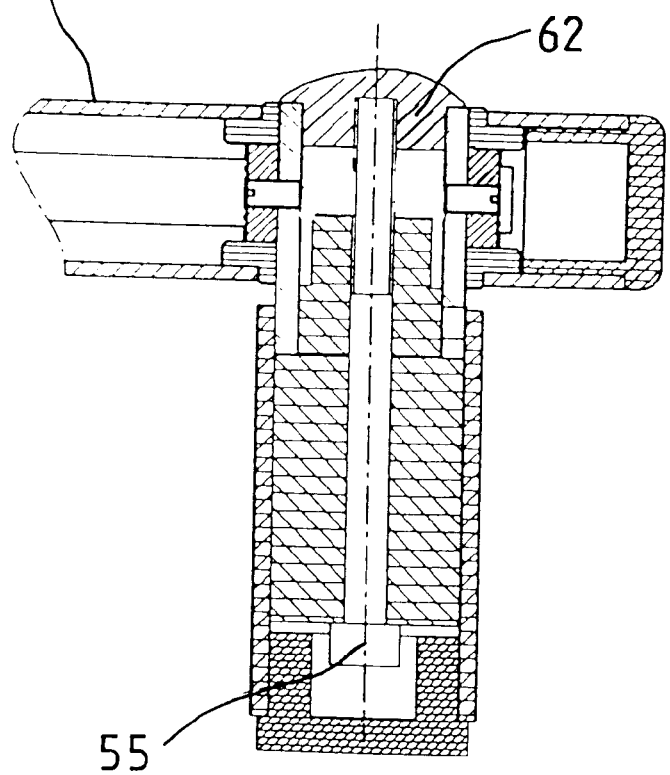

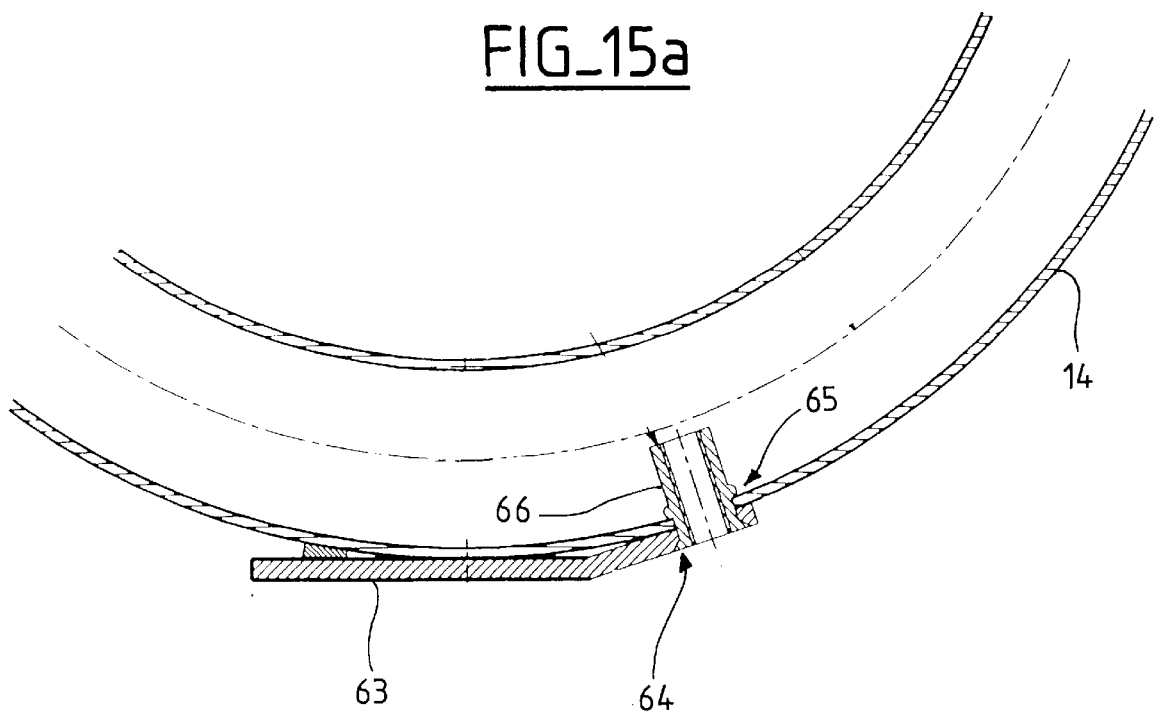
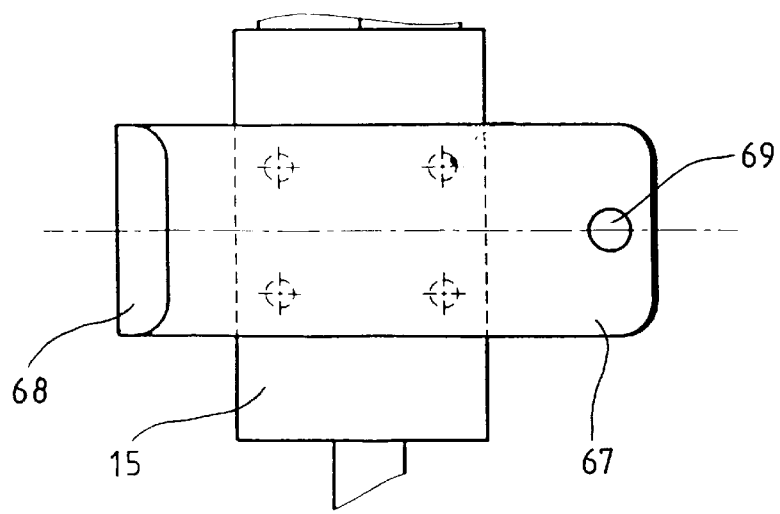

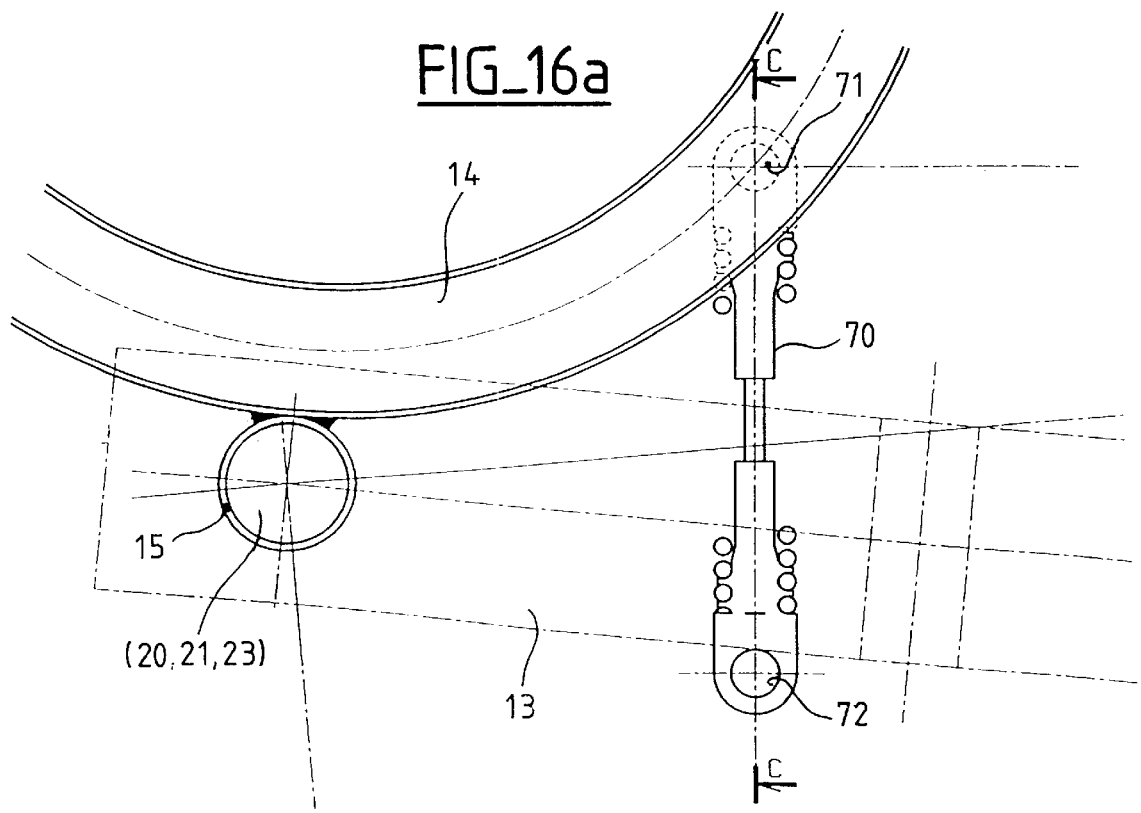
FIG_16a
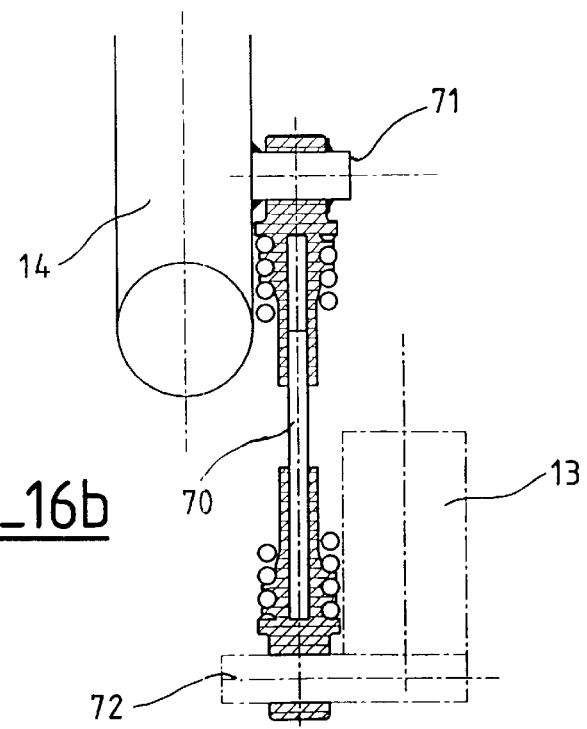
FIG_16b

FIG_17a
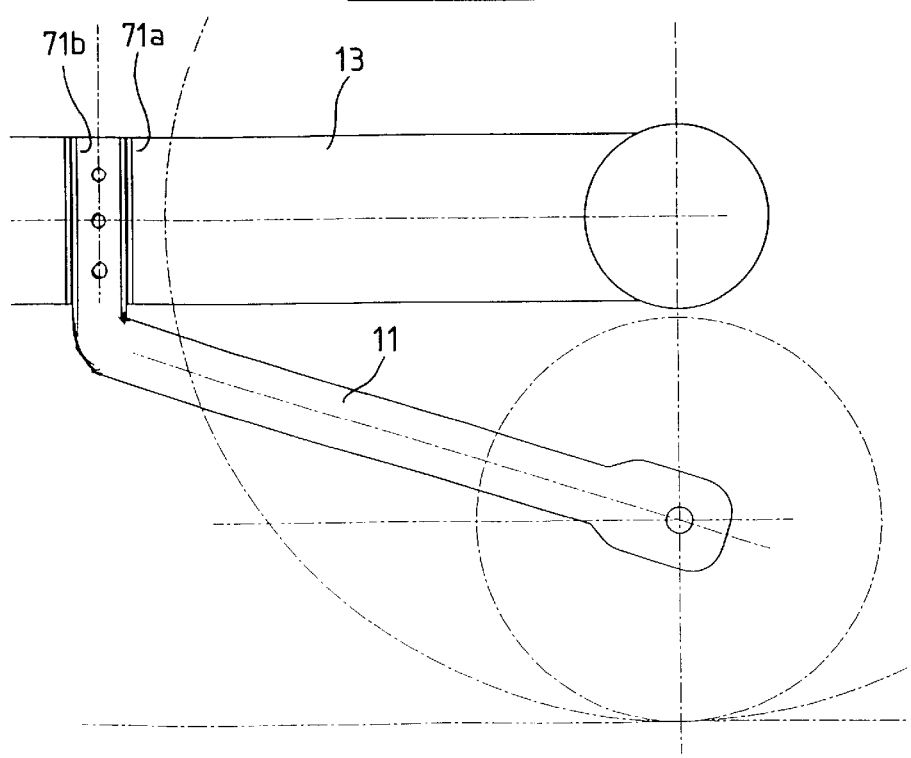
FIG_17b
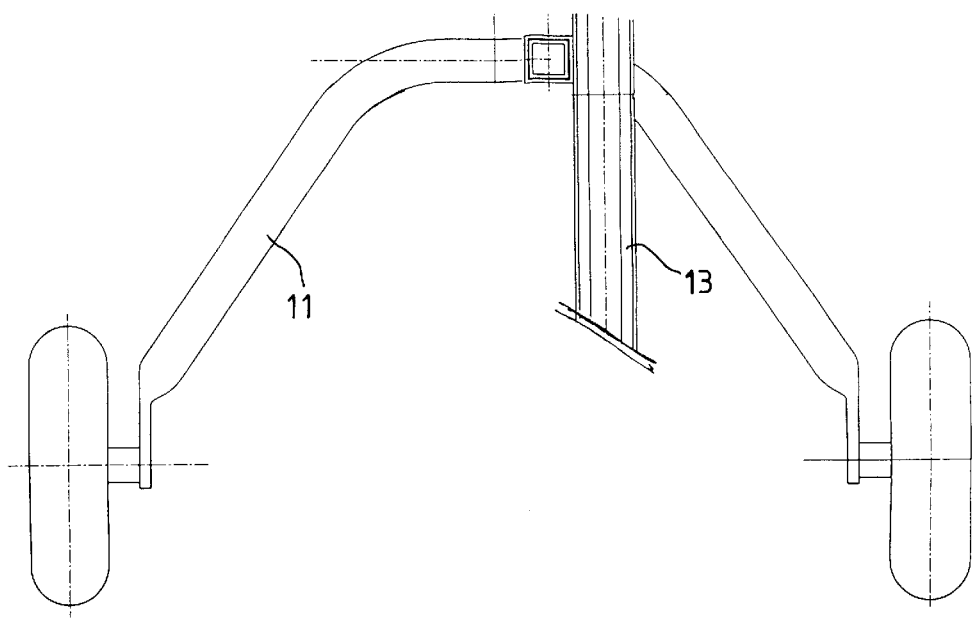

ADAPTABLE CYCLE

BACKGROUND OF THE INVENTION

The present invention relates to a cycle that is adapted to evolve between a tricycle configuration and a bicycle configuration, and to a corresponding bicycle and tricycle.

Tricycles exist for use by children from the age of two onwards. For older children, bicycles, optionally fitted with stabilizing side wheels also exist. Each of these, in itself, is satisfactory.

European Patent Application 0,187,170 discloses a bicycle having a rear wheel carrier in the form of a beam, into which a chain transmission is built. In this bicycle, like the bicycle disclosed in French patent application 2,611,641 the rear wheel is mounted in cantilevered fashion on the bicycle frame.

The invention provides a solution to the new problem of adaptability of cycles, notably cycles for use by children. As the psychomotor capacities of children develop, parents who purchased a tricycle are obliged to then fairly quickly purchase a bicycle fitted with removable stabilizing sidewheels. Apart from the problem of cost, a learning problem arises; both problems are resolved by this invention.

Cycles are already known which can be transformed from a bicycle into a tricycle. Thus, German patent 28,381 (1883) discloses the transformation of a cycle from a bicycle into a tricycle, and vice-versa. The solution disclosed in that document is however not satisfactory as it involves carrying out extremely complex technical modifications, as, according to this document, it is necessary to replace the complete rear-end system; indeed, the axle carrying the rear wheels is completely removed, in order to be replaced by a single axle carrying the rear wheel when the cycle changes from a "tricycle" configuration to the "bicycle" configuration.

U.S. Pat. No. 3,532,351 (1970) discloses a cycle that can be transformed from a cycle into a tricycle, with, in the tricycle position, only one single driving wheel. Transformation is achieved by rotating a rear auxiliary chassis, this rear chassis carrying the two tricycle wheels, one axle carrying a wheel being engaged into the drive mechanism at the rear. Not only is this solution technically complex, but, additionally necessitates significant skill and availability of tools.

All these prior art documents disclose complex technical solutions which require heavy use of tools and which are difficult to carry out by the child's parents. The invention provides a simple solution which only requires limited use of tools, or even no tools at all, and which is easy to carry out.

SUMMARY OF THE INVENTION

The invention provides a cycle adaptable between a tricycle configuration and a bicycle configuration, comprising a frame with in said bicycle configuration, a bicycle axle mounted on said frame and able to carry a rear wheel; and in said tricycle configuration, additionally a tricycle axle able to carry a second rear wheel, adapted to be coupled to said bicycle axle to form an axle carrying two wheels, said axle being mounted on the frame, said bicycle axle comprises, at one end thereof, means for coupling it either to said frame or to said tricycle axle, and means for carrying a wheel at the other end thereof, said tricycle axle comprising, at one end thereof, means for coupling it to said bicycle axle, means for carrying a wheel at the other end thereof, and, between said means for coupling it to said bicycle axle, and said wheel carrying means, means for fixing the tricycle axle to the frame.

According to one embodiment, the means for coupling the tricycle axle take the form of a reduction in cross-section at the end thereof, allowing the tricycle axle to be fitted into the bicycle axle.

According to another embodiment, the means for coupling the tricycle axle are formed by an adaptor, allowing the tricycle axle to be rendered integral with the bicycle axle.

According to yet a further embodiment, the bicycle axle is integral with the wheel it carries. In this embodiment, the wheel can comprise a recess with a large-diameter section for "bicycle" mounting, and a small-diameter section for "tricycle" mounting.

The wheel carrying means are advantageously adapted to receive wheels of various or different diameters.

Advantageously, the frame comprises a single-beam arm mounted on a forward portion of the frame and on which a rear wheel is mounted in a cantilevered fashion, in said bicycle configuration.

In one embodiment, the single-beam arm is mounted at a forward portion of said frame by suspension means.

In this case, the single-beam arm can be releasable from the forward position of the frame.

Transmission means can be incorporated in the single-beam arm and drive the bicycle axle or the tricycle axle. They can include a freewheel mechanism.

In one embodiment, the adaptable cycle has a front fork mounted on the frame, and carrying a front wheel in a cantilevered fashion.

The invention finally provides a bicycle, consisting of an adaptable cycle according to one of the above embodiments, in the bicycle configuration.

Further advantages and characteristics of the invention will become clear from the description which follows of one embodiment of the invention provided solely by way of example and with reference to the attached drawings.

BRIEF DESCRIPTION OF THE DRAWINGS

FIG. 1 is a perspective view of a cycle according to the invention, in the "tricycle" configuration.

FIG. 2 is a perspective view of the cycle in FIG. 1 in the "bicycle" configuration.

FIG. 3 is a partial view in section of the cycle of the invention, in the region where the single-beam arm is fixed to the remainder of the frame.

FIG. 4 is a partial view in section of the cycle of the invention, in plane IV—IV of FIG. 3.

FIGS. 5*a* and 5*b* are partial views, in cross-section, of the cycle of the invention, and showing the transmission system.

FIG. 6 is a partial view in section of the single-beam arm of the invention, in a plane parallel to the longitudinal plane of the cycle.

FIGS. 7*a,* 7*b* and 7*c* are partial cross-sections of the cycle of the invention in the tricycle configuration, taken at the rear wheels, according to various alternative embodiments.

FIG. 8 is a view on a larger scale of the coupling means in FIG. 7.

FIG. 9 is a view on a larger scale of the securing means in FIG. 7.

FIG. 10 is a sectional view on a larger scale of the cycle of the invention in it bicycle configuration, taken at the rear wheel.

FIG. 11 is a similar view to that in FIG. 8, in a second embodiment of the coupling means of FIG. 7.

FIG. 12 is a similar view to that in FIG. 10, in a second embodiment of the coupling means of FIG. 7.

FIG. 13 is a similar view to that in FIG. 8, in a third embodiment of the coupling means of FIG. 7.

FIG. 14 is a similar view to that in FIG. 10, in a third embodiment of the coupling means of FIG. 7.

FIG. 15a and 15b shows one manner of securing the tube forming the support for the single-beam arm onto the frame.

FIGS. 16a and 16b show, on a larger scale, one way of fixing the single-beam air using an external shock absorber.

FIGS. 17a and 17b show, on a larger scale, one way of fixing the lateral side wheels or stabilizers.

DETAILED DESCRIPTION OF PREFERRED EMBODIMENTS

FIG. 1 is a perspective view of a cycle according to the invention, in its "tricycle" configuration. All the conventional components of a tricycle can be seen: saddle 1, handlebars 2, front wheel 3; frame 4, pedals 5 and 6, rear wheels 7 and 8 linked by an axle 9. In this configuration of the cycle, the center of gravity of the cycle is located at axle 9, substantially at the mid-point thereof, thereby ensuring overall stability. Frame 4 indeed comprises, in the embodiment shown, a forward portion 14 and a single-beam arm 13.

FIG. 2 shows the cycle of FIG. 1 in a perspective view, in the "bicycle" configuration. According to the invention, this configuration is obtained by a simple transformation of the cycle, as explained below. Those elements of FIG. 1 will be recognized in FIG. 2; however, the cycle of FIG. 2 now only has one single rear wheel 10, mounted in a cantilevered fashion on frame 4. FIG. 2 also shows two accessories which can, if necessary, be mounted on the cycle: small side wheels or stabilizers 11, and a guide arm 12 for pushing and guiding the cycle. This arm can also be mounted on the cycle in its tricycle configuration shown in FIG. 1. In the bicycle configuration, the center of gravity of the cycle is on a line lying in the plane of the front and rear wheels, 3 and 10 respectively. The lateral stabilizers or side wheels 11 can be fixed to frame 4 (here at the single-beam arm 13) in conventional manner by a clamp 11'. Advantageously however, a rubber block or joint can be provided between clamp 11' and frame 4 thereby allowing the stabilizers to rotate partially, which allows them to yield slightly in the vertical direction. The stabilizers are thus able to closely follow the surface over which the bicycle is moving, which ensures that the rear wheel is always kept in permanent contact with the ground. This avoids the situation where the cycle could only be resting on the side wheels, with the rear driving wheel not in contact with the ground, and turning without propelling the bicycle.

Transformation of the configuration from a tricycle configuration of FIG. 1 to a bicycle configuration of FIG. 2 provides a simple, economical and elegant solution to problems of the prior art. Using one single cycle decreases financial outlay and facilitates learning.

In an advantageous embodiment of the invention, a single-beam arm 13 is provided at the rear portion of the frame, for supporting the wheel or wheels and for transmitting power from the pedals to the wheel or wheels. Single-beam arm 13 is laterally offset from the mid-plane of the bicycle. Rear wheel 10, in the bicycle configuration, is mounted in cantilever fashion on arm 13, thereby being situated in the mid-plane of the bicycle. In the tricycle configuration, axle 9 is mounted on arm 13, so that the mid-point of axle 9 is in the mid-plane of the bicycle, in other words offset with respect to arm 13. Arm 13 is described in more detail with reference to FIGS. 3 to 6.

On FIG. 2, an advantageous method of fixing arms 13 on the forward portion 14 of frame 4 can be partially seen: a square-section tube 15 is fastened, for example by welding, on the forward portion 14 of frame 4 supporting the saddle and front wheel; this tube acts as the support for the single-beam arm 13. Single-beam arm 13 has a side tube in the region of its front end, this side tube engaging in square-section tube 15 ensuring that single-beam arm 13 is firmly held. The outer cross-section of the side tube can be square and match the inner section of tube 15 ensuring play-free assembly. A shock absorbing system, as described with reference to FIGS. 3 and 4 can also be provided.

FIG. 3 is a partial view in section of the cycle of the invention, in the region where the single-beam arm is fixed to the remainder of the frame, in a horizontal plane for the cycle in its position of use. On FIG. 3, single-beam arm 13, the end of the right-hand pedal crank passing through arm 13, square-section tube 15 and side tube 21 fixed to beam 13 by welding, and the end of a left-hand pedal crank 22 can be seen. The end of the right-hand pedal crank 20 is surrounded by a bearing bush 23, bush 23 being extended by a projecting outer cylinder 24 which is assembled by bonding or pinning; the end of left-hand pedal crank 22 can be fitted into cylinder 24 and be secured by bonding or pinning. It can be arranged for pedal crank 22 and outer cylinder 24 to be integral with each other. In this way, the single-beam arm can be secured by introducing square tube 21 from one side, and then securing it from the other side by rigidly fixing (using, for example, a screw) cylinder 24 onto axle 20.

FIG. 4 is a partial view in section of the cycle of the invention, in the plane IV-13 IV of FIG. 3, i.e. in a vertical plane for the cycle in its position of use. Bearing bush 23 and tube 15 can be seen here. Side tube 21 has a square cross-section and is arranged inside tube 15 but is for example offset by 45° with respect thereto, so that, seen in cross-section, its outer corners are substantially on the sides of the square formed by the inner section of square-section tube 15. Shock absorbers 26 made of an elastic material, (for example elongate with a triangle cross-section) are arranged in the spaces between the tubes. The shock absorbers 26 damp and limit the pivoting movement of side tube 21 of arm 13 inside square-section tube 16. This structure provides mounting with suspension of arm 13, and thus of the rear wheel(s) on the front of frame 14. If necessary, means for restricting pivoting movement of single-beam arm 13 with respect to the remainder of the frame can also be provided using, for example, a ball 26' in one or several of the shock absorbers 26. Also, it can be arranged for square-section tube 15 to have one internal side the dimension of which is comprised between the side dimension of external square-section tube 21 and the diagonal dimension thereof. Thus, it is ensured that movement of square-section tube 21 inside square-section tube 15 are automatically limited.

FIG. 5a is a partial view in section of the single-beam arm of the invention, similar to the one in FIG. 3 (with square-section tubes), and showing here the transmission system. On FIG. 5, those elements already described with reference to FIG. 3 can be seen and are not described again here. Additionally, a plastic ring 31 preventing the two pedal cranks moving sideways at the right-hand side is fitted around cylinder 24 and is held in position, for example by a claw locking washer 25. At the left-hand side, the two pedal cranks are prevented from moving sideways by the upset portion 29" of pedal crank 20 and/or drive sprocket 29 abutting against collar 29' fitted around pedal crank 20, collar 29' being able to abut against the inner wall of arm 13. In this way, a pivotal link between side tube 21 and pedal cranks 20 and 22 is achieved. Ring 31 provides axial blocking of tube 15 with respect to side tube 21. Additionally, in a configuration allowing it to fit into, and come to bear against square-section tube 15, ring 31 forms a bearing for the unit comprising pedal cranks 20 and 22 and collar 29', ring 31 being retained by and bearing against drive sprocket wheel 29, the latter being locked thereto against rotational and translation movement, and for example constituting a bearing on the opposite side. In FIG. 5, there can be seen drive sprocket 29 which is locked to prevent rotational or translational movement on pedal crank 20, collar 29' inside single-beam arm 13, and a drive belt 30, located inside arm 13, and meshing with sprocket wheel 29, as can be clearly seen in the description of FIG. 6.

A freewheel mechanism could also be provided by mounting sprocket wheel 29 on the right-hand pedal crank via a ratchet mechanism. Similarly, a suitable mechanism could be provided for braking by backpedaling.

FIG. 5b is a partial view in section of the single-beam arm of the invention, in which the square-section tubes are replaced by circular-section tubes, the single-beam arm being mounted in the manner indicated in FIGS. 16a and 16b. In the embodiments shown, pedal crank 22 and cylinder 24 are integral. The assembly comprising the single-beam arm and axle is introduced into a cylinder 15 at bearings 15' and 15" from one side of the frame, said bearing being located respectively at oppposite sides of tube 15. The single-beam arm is then brought into abutment with bearing 15" and is locked against translatory movement by the pedal crank and the cylinder, 24 at bearing 15' by means of a screw, thereby rendering integral pedal crank shafts 20, 22. The other parts correspond as regards their shape and/or function to those parts already described in the previous FIGS., and are not described again here.

The single-beam arm and transmission system can be assembled as follows. Side tube 21 is welded onto arm 13. Drive belt 30 is arranged inside arm 13 along with sprocket wheel 29 and collar 29', and pedal crank 20 is fitted through sprocket wheel 29 and collar 29'. Next, pedal crank 20, bearing bush 23 and cylinder 24 are assembled, the latter being fixed by bonding or pinning. The unit thus constituted in mounted on the remainder of the frame by introducing side tube 21 into square-section tube 15 and providing the shock absorbers 26 therebetween, with, if necessary, the ball mentioned above. Ring 31 and locking washer 25 are arranged on cylinder 24; next, the left-hand pedal crank is bonded or pinned in cylinder 24. In this way, a rapid and simple assembly of the unit comprising pedals and single-beam arm on the forward portion 14 of frame 13 is achieved. Disassembly is simply achieved for example by removing the pin from the left-hand pedal crank, removing locking washer 25 followed by ring 31, after which the forward portion of the frame can be separated from the pedal crank/single-beam arm/wheel or wheel assembly. Square-section tube 15 can also be welded onto the lower portion of frame 14. Tube 15 could also be fixed to the frame by means of a small plate 63, this embodiment being described in more detail with reference to FIGS. 15a and 15b. The single-beam arm and transmission system can also be mounted by fitting the single-beam arm 13 by means of tube 21 and the shaft of the right-hand pedal crank 20 into a cylinder 15 fixed onto the frame, after which the assembly is rendered integral by the other pedal crank from the other side of the frame.

FIG. 6 shows a longitudinal cross-section of the single-beam arm in a plane parallel to the longitudinal plane of the cycle. In FIG. 6, arm 13, a cross-section of pedal crank 20, sprocket wheel 29 prevented from rotating and moving linearly with respect to pedal crank 20 (or mounted so as to provide a free wheel effect) and drive belt 30 can be seen. The arm is closed off at its front end by a forward plug 32. Arm 13 has, substantially at its mid-point, a hole 33 allowing, if necessary, the stabilizing side wheels shown in FIG. 2 to be mounted. The rear of the arm includes passages for an axle, and a rear sprocket wheel driven by belt 30, these parts being described in more detail below. Finally, the front end of single-beam arm 13 is closed off by a forward plug 35.

The structure of single-beam arm that has just been described with reference to FIGS. 3 to 6 constitutes an advantageous embodiment of the invention. Nevertheless, although its effect facilitates transformation of the cycle of the invention from a bicycle into a tricycle, this structure is not indispensable for such transformation. The invention described with reference to FIGS. 7 to 10 can also be implemented, without using the single beam arm of FIGS. 3 to 6.

FIG. 7a shows a partial cross-section in a horizontal plane of the cycle of the invention, taken at the rear wheel in a tricycle configuration. On FIG. 7a, arm 13, rear wheels 7 and 8 and axle 9 can be seen. Axle 9 is mounted on arm 13 for being driven in rotation by belt 30 and rear sprocket wheel 34. One embodiment of the link between the axle and single-beam arm 13 is described later in more detail with reference to FIG. 10. In FIG. 7, axle 9 is constituted by two parts, a tricycle axle 36 and a bicycle axle 37. At one end of the tricycle axle, a wheel 7 is mounted; at its other end, the tricycle axle has means 38 for coupling it to bicycle axle 37. Between wheel 7 and coupling means 38, at around its mid point, tricycle axle 36 has means 39 for securing it to the single-beam arm.

At one end of bicycle axle 37, a wheel 8 is mounted; the other end of the bicycle axle carries means 40 for coupling it to tricycle axle 36, or to single-beam arm 13.

The overall length of bicycle axle 37 and tricycle axle 36 in their assembled state, i.e. when they are coupled together through the means 38 and 40, corresponds to the distance between the wheels in the tricycle configuration of the cycle according to the invention. The length of bicycle axle 37 is such that, when this axle is mounted on a single-beam arm 13, wheel 8 lies in the mid-plane of the bicycle, represented by line 41 on FIG. 7. Additionally, the bicycle axle includes securing means 39 which are situated at a distance such that after the tricycle axis is fastened in place, the two wheels are symmetrical with respect to this mid-line 41.

Operations on the cycle of the invention are carried out as follows. For a tricycle configuration, tricycle axle 36 is mounted on single-beam arm 13 using securing means 39 (and screw 47) so that it is driven by rear sprocket wheel 34. Next, bicycle axle 37 is fitted onto tricycle axle 36, using the coupling means 38 and 40 (and screw 42). In this way, an axle 9 with two wheels 7 and 8 is obtained. For a bicycle configuration, bicycle axle 37 is directly mounted on single-beam arm 13 using coupling means 40 and 37' (and screw 47) for it to be driven by rear sprocket wheel 34. Tricycle axle 36 is not used.

The operations making it possible to change from one configuration to the other are simple and fast. Use of the single-beam arm makes it possible to simplify as much as possible the coupling means 39 (screw 47) and 40 (and 37' and screw 42) and securing means 38. Clearly, one could also use a conventional bicycle frame, for example by providing more complex coupling and securing means, and incorporating thereinto if necessary, drive sprocket wheels.

FIG. 7b is a view in partial cross-section, in a horizontal plane, of one alternative embodiment of the cycle of the invention, taken at the rear wheel, in a tricycle configuration. On FIG. 7b, arm 13, and axle 9 can be seen. Axle 9 is mounted on arm 13 so as to be driven in rotation by belt 30 and rear sprocket wheel 34. Sprocket wheel 34 is locked in position by interfitting of two flange plates 34a and 34b into a tube 13'. Tube 13' is positioned perpendicularly to arm 13 and is integral therewith; tube 13' includes a passage allowing the transmission belt 30 to pass over rear sprocket wheel 34. Between flange plates 34a and 34b, roller bearings 44 and 45 are provided to ensure minimal friction. Axle 9 is constituted by two parts, a tricycle axle 36 and a bicycle axle 37. At one end of the tricycle axle, a wheel 7 is mounted; at the other end, the tricycle axle has means 38 for coupling it to bicycle axle 37. Between wheel 7 and the coupling means 38, at about its mid-point, tricycle axle 36 has means 39 for securing it to the single-beam shaft, (comprising a spring-mounted detent or a push-button fastener 47). For a tricycle configuration, tricycle axle 36 is mounted on single-beam arm 13, using securing means 39, (and the spring-loaded detent or push-button means 47) thereby ensuring that is is driven in rotation by rear sprocket wheel 34. Next, bicycle axle 37 is assembled onto tricycle axle 36, using coupling means 38 and 40, (including the spring-loaded detent or push-button means 42). In this way an axle 9 is obtained with two wheels 7 and 8. For a bicycle configuration, bicycle axle 37 is directly mounted onto single-beam arm 13, using coupling means 40, and the spring-loaded detent or push-button means 37', the latter thereby occupying the position previously occupied by the spring-loaded detent or push-button means 47, whereby axle 37 is driven by the rear sprocket wheel 34. Tricycle axle 36 is not used.

FIG. 7c is a view in partial section in a horizontal plane of one alternative embodiment of the cycle of the invention, taken at the rear wheel, in a tricycle configuration. Compared to the two previous alternative embodiments, it will be seen that bicycle axle 37 is integral with the wheel; this wheel then has a recess with a bearing, defining two regions 8' and 8" of different cross-section. The region 8" having the largest cross-section is designed to be directly mounted onto the securing means 39 in the bicycle configuration, while the smaller cross-section region 8' is designed to receive the tricycle axle. Bicycle axle 37 is integral at one end with the wheel 8 that it receives, while carrying at the other end the coupling means 40 which are made up by means 37' and 37" for ensuring coupling to the cycle frame, and means 37a taking, for example, the form of a thread, for coupling the tricycle axle at the coupling means 38.

FIG. 8 shows the coupling means 38 and 40 of FIG. 7 on a larger scale. The coupling means 38 for tricycle axle 36 are formed by a contraction or neck of the tube forming the axle inside of which a round threaded portion can be inserted and fixed. In this way, the end of axle 36 can engage into axle 37. A screw 42 enables axle 36 to be fixed with respect to axle 37. Thus, a simple and accurate assembly of tricycle axle 36 and bicycle axle 37 is obtained.

FIG. 9 shows the securing means of FIG. 7 on a larger scale. At its rear end, beam 13 has openings into which a support cylinder 43 is mounted via anti-friction bearings, ball races or similar, 44 and 45. The latter additionally act as end plates for the rear sprocket wheel 31 which is mounted so as to be locked in rotation on support cylinder 43. A freewheel mechanism could also be provided by mounting sprocket wheel 31 on support cylinder 43 via a ratchet mechanism. One or several screw(s) 46 prevent relative translatory movement between them. Assembly can be done as follows. First, anti-friction bearings 44 and 45 are assembled in the passages of beam 13. Next, sprocket wheel 31, over which belt 30 passes, is mounted opposite the passages in arm 13. Next, support cylinder 43 is introduced through the anti-friction bearings and the sprocket wheel, the complete assembly being locked against translatory movement by screw 46. Other means, such as for example locking sprocket wheel 31 against translatory movement similarly to forward sprocket wheel 29, or using circlips inside the single-beam arm, etc. can be employed to ensure locking.

Screw 47 ensures tricycle axle 36 and support cylinder 43 (which can be threaded) are locked in rotation and translatory movement. This screw makes it possible to rapidly assemble and disassemble tricycle axle 36. Advantageously, a threaded round portion 48 is provided in the tricycle axle for receiving screw 42 and preventing crushing of the tricycle axle. The round portion 48 can be secured by welding.

FIG. 10 is a sectional view on a larger scale of the cycle of the invention in a bicycle configuration. As explained with reference to FIG. 7, in this configuration, bicycle axle 37 is directly mounted on single-beam arm 13. The bicycle axle can be mounted using the screw 47, in a similar fashion to the tricycle axle: the end of the bicycle axle is introduced into support cylinder 43 and screw 47 ensures that bicycle axle 37 and support cylinder 43 are locked together in rotation and translatory movement via securing support 37'.

As shown in FIG. 10, a sleeve can be provided on the bicycle axle for mounting a wheel, allowing a 12 inch wheel to be mounted. Thus the two types of wheel most commonly used, or more generally any type of wheel, including those fitting with a freewheel mechanism can be fitted in an economical fashion. Obviously, the wheel carrier of tricycle axle 36 can have the same configuration. The same type of device can be mounted on the front wheel axle, allowing various wheels to be mounted.

In FIGS. 8, 9 and 10, the screws can be replaced by spring-loaded pin or pushbutton-type locking means and vice-versa, or by any other securing means not necessarily described herein.

FIG. 11 is a view similar to that in FIG. 8, illustrating a second embodiment of the coupling means of FIG. 7; in this embodiment, the end of tricycle axle 49 is not reduced in diameter. Bicycle axle 50 comprises an adaptor 51, having a small diameter section 52 and a large diameter section 53. Small diameter section 52 is designed to be introduced, with minimal play, inside the end of the tube forming tricycle axle 49. Adaptor 51 is bonded onto a sleeve 54 on which a wheel can be mounted. An axial screw 55 passes through sleeve 54, and through adaptor 51. A ring 56 in rubber or a compressible material is fitted onto the threaded end of screw 55 which projects out of adaptor 51. A nut 57 is screwed onto the end of screw 55.

Bicycle axle 50 is assembled into tricycle axle 49 by introducing nut 57, ring 56, and the small diameter section 52 of adaptor 51 into the end of the tricycle axle, the large diameter section 53 of adaptor 51 abutting against the end of the tricycle axle. Next, screw 55 is tightened and ring 56, compressed by nut 57 against adaptor 51 extends against the inner wall of the tricycle axle thereby ensuring coupling of the two axles. Disassembly involves the reverse steps.

FIG. 12 is similar to FIG. 10, in a second embodiment of the coupling means of FIG. 7; bicycle axle 50 is mounted inside support cylinder 43 like it was inside tricycle axle 49. However, here, it is the large diameter section 53 of adaptor 51 which bears against the inner wall of support cylinder 43. A cover plate 58 can be provided on support cylinder 43 for hiding nut 57.

FIG. 13 is a view similar to FIG. 8, in a third embodiment of the coupling means of FIG. 7; the third embodiment is similar to the second embodiment, except that nut 57 is replaced by nut 60 welded inside the tricycle axle. Ring 56 is also replaced by a simple washer 61. Assembly and disassembly involved simply screwing or unscrewing screw 55 into or out of nut 60.

FIG. 14 is a view similar to FIG. 10 in a third embodiment of the coupling means of FIG. 7; here a releasable nut also constituting a cover is provided. Nut 62 is provided at one end of support cylinder 43 and screw 55 of the bicycle axle is screwed into nut 62, passing through support cylinder 43. The bicycle axle is fixed onto cylinder 43, the end of sleeve 54 bearing against cylinder 43.

FIGS. 15a and 15b show one way of fixing square-section tube 15 onto frame 14. A small plate 63 is welded onto the lower portion of frame 14, the plate having a hole 64 at one end which matches a identical holes 65 formed in the portion of the frame opposite it. The two are kept together by, for example, fitting a quick-fit nut 66 through holes 64 and 65. Square-section tube 15 has a second small plate 67 designed to match the shape of plate 63 welded onto it. One end of plate 67 is folded to form a channel 68 and the other end carries a hole 69 which is identical to, and designed to come opposite holes 64 and 65. By inserting small plate 63 into channel 68, the two plates can be rendered integral by a screw screwed down into the quick-fit nut referred to above. Disassembly involves the reverse operations.

FIGS. 16a and 16b show one embodiment in which single-beam arm 13 is secured to the forward portion 14 of the frame by means of an external shock absorber 70, FIG. 16b corresponding to a sectional view of FIG. 16a along line C—C. The drive mechanism passes through the single-beam arm 13, the mechanism being engaged inside a cylinder 15 welded at the lower part of the forward portion of the frame 14. An external shock absorber 70 links the single-beam arm and the frame, the shock absorber being secured at each end by engaging it over suitably located pins 71, 72. When the drive mechanism is being inserted into place, the shock absorber is also mounted by slipping it over the pins, and is retained in this position as it has the single-beam arm on one side, and the frame on the other side.

FIGS. 17a and 17b show a top and side view of one manner of fixing the lateral stabilizers or side wheels 11, which are mounted by interfitting two tubes 71a and 71b, which, for example, have a square cross-section. Equidistant holes drilled in the square section tube, rigidly fixed to the single-beam arm, can be provided, able to receive a spring-loaded detent or push-button located on the interfitted tube. This allows height adjustment of the lateral stabilizers or side wheels, and ensures they can be fitted (and removed) as well as adjusted, in a very simple and easy manner.

The embodiments of the coupling means each have their own advantages, and can all be employed for implementing the invention and, if necessary, be combined.

Obviously, the invention is not limited to the embodiments described and illustrated but may be subject to numerous variations available to those skilled in the art without departing from the scope of the invention. For example, the single-beam arm is not necessarily of a one-piece construction and can also be formed by assembling several parts. The wheel can be suspended in a cantilevered fashion, or the transmission can be offset with respect to the longitudinal plane of the cycle without necessarily employing a single-beam arm of the type in FIGS. 3 to 6.

Means other than the coupling means 38 and 40 can be employed as can other securing means different from the securing means 39 described above, depending on the structure of the cycle frame, and the transmission means are not necessarily formed by a belt 30.

Finally, the invention clearly applies to other types of product, such as scooters, pedal carts and to any type of wheeled toy. The term 'bicycle" in this specification covers not only the conventional bicycle, but more generally any type of product having an axle with a single wheel: the term could thus also cover a scooter with a single rear wheel. Similarly, the term "tricycle" covers any type of product having an axle with two wheels: the term could thus cover a scooter having two rear wheels.

The frame of the cycle, as well as the drive system and the single-beam arm, can additionally be employed for providing non-transformable cycles; using the same structures as a basis, it is thus possible to provide three separate products: a bicycle, a tricycle, and an adaptable cycle. Notably, it is possible to obtain a bicycle carrying the single-beam arm according to the embodiment of FIG. 5b and/or according to FIGS. 16a/16b, with, optionally, the lateral stabilizers which can be secured according to the embodiment described above. The single-beam arm, the manner of securing it onto the frame via the transmission system, the built-in drive belt transmission securing by means of an external shock absorber, the manner of attaching the lateral stabilizers or side wheels (by interfitting or by means of a clamp provided with a rubber block or dumper) are alternative embodiments which are all inventive per se and which can be applied to all the cycles.

What is claimed is:

1. A cycle adaptable between a tricycle configuration and a bicycle configuration, comprising a frame with in said bicycle configuration, a bicycle axle mounted on said frame and carrying a rear wheel; and in said tricycle configuration, in addition to said bicycle axle carrying a rear wheel, a tricycle axle carrying a second rear wheel, coupled to said bicycle axle to form an axle carrying two wheels, said tricycle axle being mounted on the frame, said bicycle axle comprising, at one end thereof, means for coupling it either to said frame or to said tricycle axle, and means for carrying said rear wheel at the other end thereof, in said tricycle configuration, said tricycle axle comprising, at one end thereof, means for coupling it to said bicycle axle, means for carrying said second rear wheel at the other end thereof, and, between said means for coupling it to said bicycle axle and said means for carrying said second rear wheel, means for fixing the tricycle axle to the frame.

2. The adaptable cycle according to claim 1, wherein said means for coupling the tricycle axle are formed by a portion of reduced cross-section at the end thereof, allowing said tricycle axle to be engaged into said bicycle axle.

3. The adaptable cycle according to claim 1, wherein said means for coupling the tricycle axle are formed by an adaptor, allowing said tricycle axle to be rendered integral with said bicycle axle.

4. The adaptable cycle according to claim 1, wherein said frame comprises a single-beam arm mounted on a forward portion of said frame and on which a rear wheel is mounted in a cantilevered fashion, in said bicycle configuration.

5. The adaptable cycle according to claim 4, wherein said single-beam arm can be released from said frame.

6. The adaptable cycle according to claim 4, wherein said single-beam arm is mounted at a forward portion of said frame by suspension means.

7. The adaptable cycle according to claim 6, wherein said suspension means are integrated into said single-beam arm in the region where said single-beam arm is secured onto the remainder of said frame.

8. The adaptable cycle according to claim 6, wherein said single-beam arm is secured onto the remainder of said frame by means of an external shock absorber.

9. The adaptable cycle according to claim 4, having transmission means incorporated in said single-beam arm and driving said bicycle axle or said tricycle axle.

10. The adaptable cycle according to claim 9, wherein said transmission means includes a freewheel mechanism and/or a mechanism for braking by backpedaling.

11. The adaptable cycle according to claim 2, wherein said frame comprises a single-beam arm mounted on a forward portion of said frame and on which a rear wheel is mounted in a cantilevered fashion, in said bicycle configuration.

12. The adaptable cycle according to claim 11, wherein said frame comprises a single-beam arm mounted on a forward portion of said frame from which it can be released.

13. The adaptable cycle according to claim 11, wherein said single-beam arm is mounted at a forward portion of said frame by suspension means, where said means are an external shock absorber.

14. The adaptable cycle according to claim 11, having transmission means incorporated in said single-beam arm and driving said bicycle axle or said tricycle axle.

15. A bicycle, constituted by an adaptable cycle according to claim 1 in its bicycle configuration.

16. The bicycle according to claim 15, carrying lateral stabilizers or side wheels fixed on said frame by clamping means, a rubber block being present between said clamping means and the frame.

17. The bicycle according to claim 15, comprising adjustable-height lateral stabilizers or side wheels.

18. A cycle adaptable between a tricycle configuration and a bicycle configuration, comprising a frame with in said bicycle configuration, a bicycle axle mounted on said frame and carrying a rear wheel; and in said tricycle configuration, in addition to said bicycle axle carrying a rear wheel, a tricycle axle carrying a second rear wheel, coupled to said bicycle axle to form an axle carrying two wheels, said tricycle axle being mounted on the frame, said bicycle axle comprising, at one end thereof, means for coupling it either to said frame or to said tricycle axle, and means for carrying said rear wheel at the other end thereof, in said tricycle configuration, said tricycle axle comprising, at one end thereof, means for coupling it to said bicycle axle, means for carrying said second rear wheel at the other end thereof, and, between said means for coupling it to said bicycle axle and said means for carrying said second rear wheel, means for fixing the tricycle axle to the frame;

wherein said means for coupling the tricycle axle are formed by a portion of reduced cross-section at the end thereof, allowing said tricycle axle to be engaged into said bicycle axle;

wherein said frame comprises a single-beam arm mounted on a forward portion of said frame and on which a rear wheel is mounted in a cantilevered fashion, in said bicycle configuration, said single-beam arm being releasable from said frame.

19. The adaptable cycle according to claim 18, wherein said single-beam arm is mounted at a forward portion of said frame by suspension means, where said means are an external shock absorber.

20. The adaptable cycle according to claim 18, having transmission means incorporated in said single-beam arm and driving said bicycle axle or said tricycle axle.

* * * * *